(12) United States Patent
Sankrithi et al.

(10) Patent No.: US 10,850,655 B2
(45) Date of Patent: Dec. 1, 2020

(54) SHAPE ADAPTING SYSTEM AND METHOD FOR A CUSHION ASSEMBLY

(71) Applicant: THE BOEING COMPANY, Chicago, IL (US)

(72) Inventors: Mithra Sankrithi, Edmonds, WA (US); Sergey Barmichev, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/114,328

(22) Filed: Aug. 28, 2018

(65) Prior Publication Data

US 2020/0070702 A1 Mar. 5, 2020

(51) Int. Cl.
*B60N 2/90* (2018.01)
*B60N 2/64* (2006.01)
*B60N 2/70* (2006.01)
*B64D 11/06* (2006.01)

(52) U.S. Cl.
CPC ............. *B60N 2/914* (2018.02); *B60N 2/643* (2013.01); *B60N 2/646* (2013.01); *B60N 2/70* (2013.01); *B64D 11/0647* (2014.12)

(58) Field of Classification Search
CPC ........ B60N 2/914; B60N 2/643; B60N 2/646; B60N 2/70; B64D 11/0647
USPC .................................................... 297/284.6
See application file for complete search history.

(56) References Cited

U.S. PATENT DOCUMENTS

| | | | | |
|---|---|---|---|---|
| 4,143,909 A * | 3/1979 | McFarlin | ............... | A47C 31/11 297/284.1 |
| 4,852,195 A * | 8/1989 | Schulman | .......... | A61G 7/05776 5/713 |
| 5,369,828 A * | 12/1994 | Graebe | ..................... | A47C 4/54 5/654 |
| 5,502,855 A * | 4/1996 | Graebe | ................ | A61G 5/1043 5/654 |
| 5,927,807 A * | 7/1999 | Heller | ...................... | A47C 4/54 297/284.3 |
| 6,519,797 B1 * | 2/2003 | Brubaker | ............. | A61G 5/1043 36/29 |
| 2003/0030319 A1 * | 2/2003 | Clapper | ................... | A47C 4/54 297/452.41 |
| 2003/0192125 A1 * | 10/2003 | Graebe | ................ | A47C 27/081 5/710 |
| 2004/0222611 A1 * | 11/2004 | Fenwick | ................ | A61G 5/006 280/250.1 |
| 2005/0151410 A1 * | 7/2005 | Sprouse, II | .............. | A47C 7/14 297/452.41 |
| 2011/0258783 A1 * | 10/2011 | Rickman | ............ | A61G 7/05769 5/710 |

(Continued)

*Primary Examiner* — Mark R Wendell
(74) *Attorney, Agent, or Firm* — The Small Patent Law Group LLC; Joseph M. Butscher

(57) ABSTRACT

A shape adapting system of a cushion assembly and method of forming a shape adapting system of a cushion assembly include an array of cells that retain a fluid, a fluid exchange sub-system coupled to the cells, wherein the fluid exchange sub-system fluidly connects the cells together, and at least one valve coupled to the fluid exchange sub-system. The valve(s) is configured to move between an open position in which the fluid is able to migrate among the cells to change a shape of the support base, and a closed position in which the shape of the support base is maintained.

22 Claims, 13 Drawing Sheets

(56) References Cited

U.S. PATENT DOCUMENTS

| | | | |
|---|---|---|---|
| 2013/0186697 A1* | 7/2013 | Schneider | B60L 8/003 |
| | | | 180/2.2 |
| 2014/0020186 A1* | 1/2014 | Fan | A61G 5/10 |
| | | | 5/654 |
| 2014/0230153 A1* | 8/2014 | Fraser | A61G 5/1043 |
| | | | 5/654 |
| 2014/0319890 A1* | 10/2014 | Rivera | A47C 7/467 |
| | | | 297/284.4 |
| 2018/0311089 A1* | 11/2018 | Sachdev | A61G 5/1045 |
| 2019/0125094 A1* | 5/2019 | Sprouse, II | A47C 7/021 |
| 2019/0183257 A1* | 6/2019 | Arzanpour | A47C 7/142 |

\* cited by examiner

SHAPE ADAPTING SYSTEM AND METHOD FOR A CUSHION ASSEMBLY

FIELD OF EMBODIMENTS OF THE DISCLOSURE

Embodiments of the present disclosure generally relate to shape adaptable systems and methods for cushion assemblies, such as including seat cushions, backrests, headrests, and/or the like.

BACKGROUND OF THE DISCLOSURE

Commercial aircraft typically include an interior cabin having numerous passenger seats. A typical passenger seat onboard a commercial aircraft has a limited size, and provides limited adjustability. For example, a backrest of a passenger seat may be configured to recline a limited amount.

During a flight, particularly during long range flights, passengers may spend relatively long periods of time (such as one or more hours) in a seated position. As can be appreciated, passenger comfort during a flight may be reduced due to being seated in a relatively constrained position.

SUMMARY OF THE DISCLOSURE

A need exists for a more comfortable seat assembly. Further, a need exists for a seat assembly that allows an individual to adjust support positions and pressure points. Moreover, a need exists for a lightweight seat assembly that may be used in an aircraft (in which reduced weight reduces fuel consumption and costs, for example).

With those needs in mind, certain embodiments of the present disclosure provide a shape adapting system of a cushion assembly. The shape adapting system includes a support base including an array of cells that retain a fluid, a fluid exchange sub-system coupled to the cells (wherein the fluid exchange sub-system fluidly connects the cells together), and at least one valve coupled to the fluid exchange sub-system. The valve(s) is configured to move between an open position in which the fluid is able to migrate among the cells to change a shape of the support base, and a closed position in which the shape of the support base is maintained.

A control may be operatively coupled to the valve(s). The control is configured to selectively move the valve(s) between the open position and the closed position. In at least one embodiment, the control may be coupled to an armrest.

Each of the cells may include a main body defining an internal fluid-retaining chamber. At least one of the cells may be formed of an elastomeric material.

The fluid may be a gas. As an example, the gas may be air. In at least one other embodiment, the fluid may be a liquid. For example, the liquid may be water.

In at least one embodiment, the cells are hexagonal and interconnected together in a honeycomb pattern.

The fluid exchange sub-system may include one or more tubes connected to fluid couplings that connect to the cells. The fluid exchange sub-system may include a hub that is in fluid communication with the cells. The valve(s) may be a single valve at the hub. Optionally, a plurality of valves may be associated with the cells, respectively. A retaining tray may retain the array of the cells. The cells are configured to allow the fluid to migrate among the cells when the valve(s) is in the open position in response to force exerted into the support base.

A pump may be in fluid communication with the fluid exchange sub-system. The pump is configured to be operated to selectively inflate and deflate the cells.

In at least one embodiment, each of the cells may include an inflator that allows an individual to manually add additional fluid pressure thereto. The inflator may include an inlet check valve coupled to a ballast, and an outlet check valve coupled to the ballast opposite from the inlet check valve.

Certain embodiments of the present disclosure provide a method of forming a shape adapting system of a cushion assembly that includes providing a support base including an array of cells that retain a fluid, fluidly connecting the cells together by coupling a fluid exchange sub-system to the cells, and coupling at least one valve to the fluid exchange sub-system, wherein the at least one valve is configured to move between an open position in which the fluid is able to migrate among the cells to change a shape of the support base, and a closed position in which the shape of the support base is maintained.

Certain embodiments of the present disclosure provide a seat assembly that includes a seat cushion, a backrest coupled to the seat cushion, and a shape adapting system coupled to one or both of the seat cushion or the backrest.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide seat assemblies that increase comfort, and may be used onboard commercial vehicles. Embodiments of the present disclosure provide seat assemblies that increase passenger comfort during a trip. The seat assemblies include a shape adapting system that is configured to adapt to a desired shape. In at least one embodiment, a shape is changed or adapted by changing a pressure field distribution in fluid-retaining cells when a valve(s) is in an open position.

Figure 1:
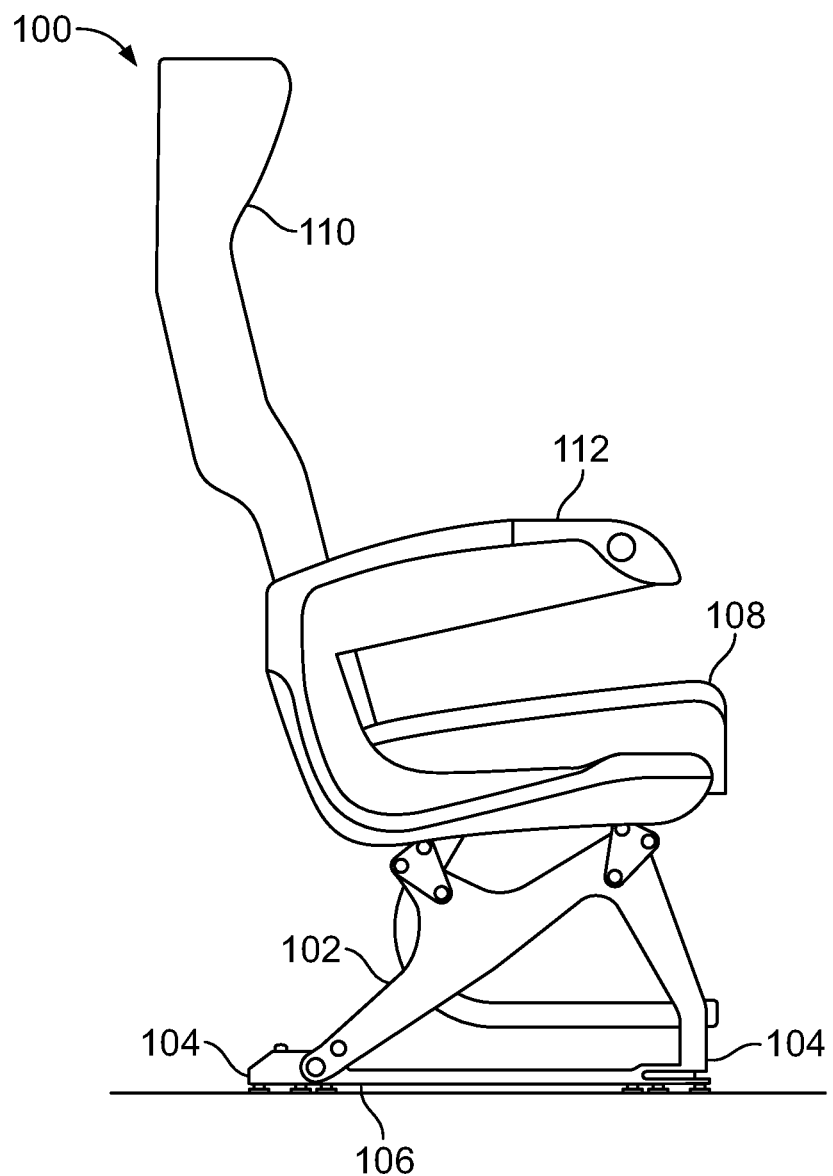
FIG. 1 illustrates a side view of a seat assembly, according to an embodiment of the present disclosure.

FIG. 1 illustrates a side view of a seat assembly 100, according to an embodiment of the present disclosure. In at least one embodiment, the seat assembly 100 may be configured to be secured within an interior cabin of a vehicle, such as a commercial aircraft.

The seat assembly 100 includes a base 102, which may include legs 104 that may be secured to tracks 106 within an interior cabin of a vehicle. The legs 104 may include fittings, fasteners, or the like that are configured to securely connect the legs 104 to the tracks 106. The base 102 supports a seat cushion 108 and a backrest 110. Armrests 112 may be pivotally secured to the backrest 110 and/or the base 102.

As described herein, the seat assembly 100 includes a shape adapting system that allows an individual to change a shape of the seat assembly 100 in order to increase comfort. For example, the shape adapting system may be part of the seat cushion 108 and/or the backrest 110. In at least one embodiment, the shape adapting system may include a support base on or within the cushion 108. The support base is configured to support an individual. In at least one embodiment, the shape adapting system may include a support base on or within the backrest 110. In at least one other embodiment, the shape adapting system may include a support base on or within the cushion 108 and a support base on or within the backrest 110.

As noted, the seat assembly 100 including the shape adapting system may be within a vehicle, such as a commercial aircraft. The shape adapting system may be used with various seat assemblies, whether within the vehicles or other structures. For example, the shape adapting system may be used with a seat assembly in a fixed structure, such as a building.

Figure 2:
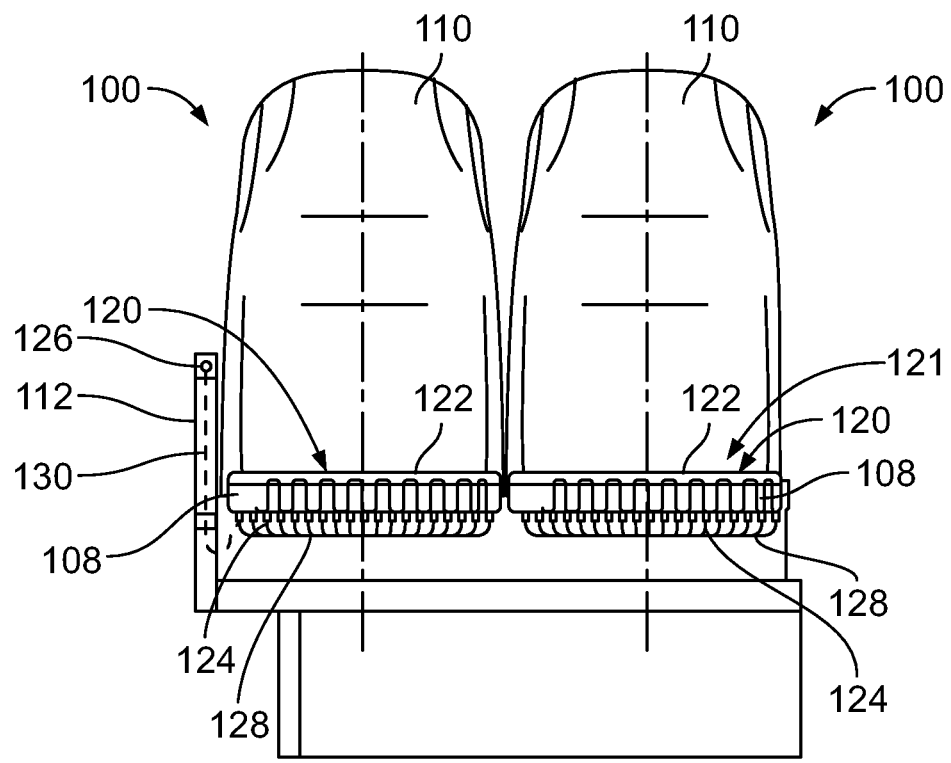
FIG. 2 illustrates a front view of seat assemblies, according to an embodiment of the present disclosure.
Figure 3:
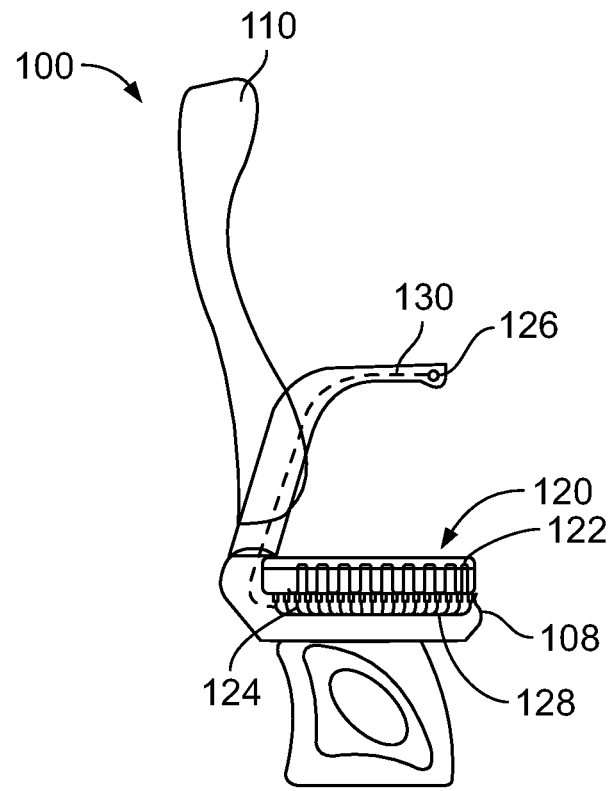
FIG. 3 illustrates a side view of a seat assembly, according to an embodiment of the present disclosure.

FIG. 2 illustrates a front view of seat assemblies 100, according to an embodiment of the present disclosure. FIG. 3 illustrates a side view of a seat assembly 100. Referring to FIGS. 2 and 3, the seat assemblies 100 may include a shape adapting system 120. The shape adapting system 120 includes a support base 122 operatively coupled to a fluid exchange sub-system 124 and a control 126 operatively coupled to one or more valves 128 of the fluid exchange sub-system 124. The control 126 is configured to be operated to selectively move the valve(s) 128 between an open position and a closed position. The open position may be fully open (such as 100% open) and the closed position (such as 0% open). The control 126 may move the valve(s) 128 between an open position (such as the fully open position), and the closed position, and all points in between (such as 25% open, 50% open 75% open). In at least one embodiment, the valve(s) 128 is configured to move between the open position in which fluid is able to migrate among fluid-retaining cells to enable a change of shape of the support base 122 responsive to a changed load distribution associated with a movement of an occupant seated in the seat assembly 100, and a closed position in which a change of shape of the support base 122 is resisted, such as by inhibition of migration of fluid among the cells.

A seat cushion, such as the seat cushion 108 that includes the shape adapting system 120, is an example of a cushion assembly 121. Optionally, the cushion assembly 121 may be or include a backrest having the shape adapting system 120. In at least one other embodiment, the cushion assembly 121 may be or include a headrest, a mattress, pad, and/or the like As shown, the support base 122 may be on or within the seat cushion 108. Optionally, the support base 122 may be on or within the backrest 110. In at least one other embodiment, one or more support bases 122 are on or within the seat cushion 108 and the backrest 110. The support base 122 may be exposed and configured to directly support portions of an individual. For example, an individual may directly sit on the support base 122. In at least one other embodiment, a cover may be positioned over the support base 122. Optionally, a foam pad may be disposed over the support base 122, such as between an upper surface of the support base 122 and a lower surface of the cover.

The control 126 may be positioned on or within an armrest 112. The control 126 may be one or more of a button, lever, dial, switch, or the like that is operatively coupled to the valve(s) 128, such as through a connection 130. The connection 130 may be one or more wires that operatively couple the control 126 to the valve(s) 128. For example, the control 126 may be configured to electrically control the valve(s) 128 through one or more wires or cables. In at least one other embodiment, the control 126 may be configured to electrically control the valve(s) 128 through a wireless connection. Optionally, the control 126 may be configured to control the valve(s) 128 through non-electrical connections, such as through a mechanical connection (for example, one or more cables), pneumatics, hydraulics, and/or the like. Optionally, the control 126 may be positioned at various other areas, such as at a side or bottom of the seat cushion 108, a side or top of the backrest 110, a rear of an immediately forward backrest 110, and/or the like.

Figure 4:
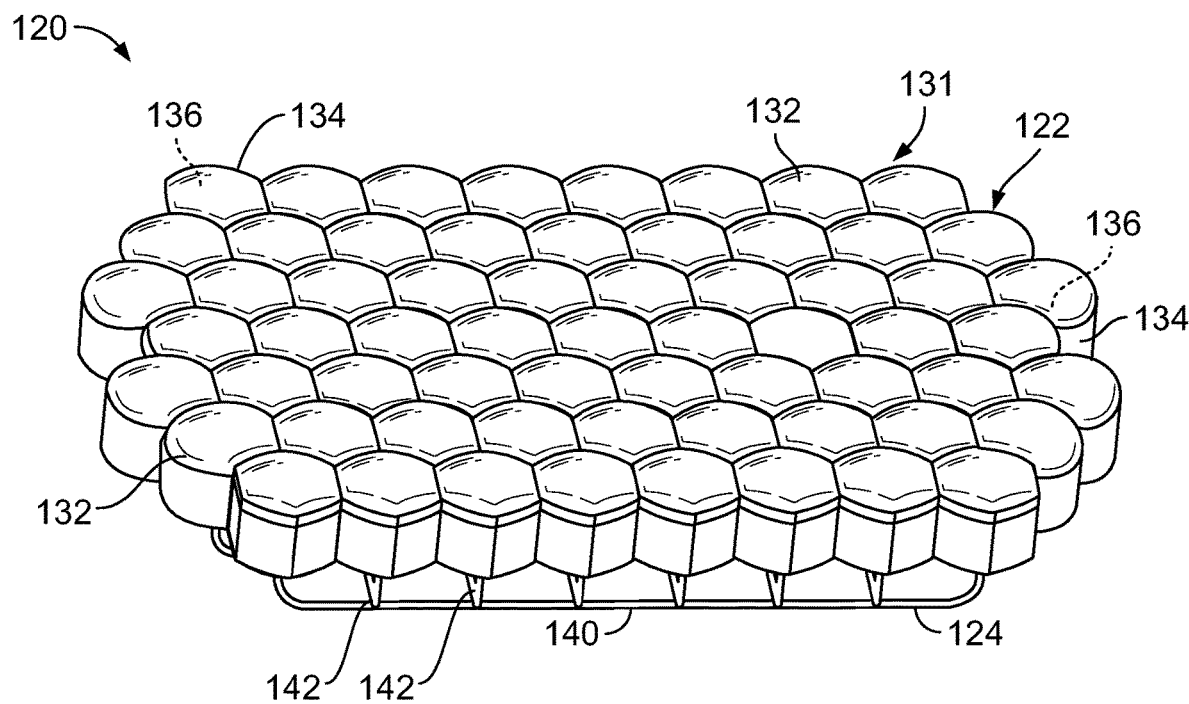
FIG. 4 illustrates a perspective top view of a support base of a shape adapting system, according to an embodiment of the present disclosure.

FIG. 4 illustrates a perspective top view of the support base 122 of the shape adapting system 120, according to an embodiment of the present disclosure. The support base 122 includes an array 131 of fluid-retaining cells 132 that are fluidly coupled together via the fluid exchange sub-system 124. Each cell 132 includes a main body 134 that defines an internal fluid-retaining chamber 136. The cells 132 may be individual housings that are interconnected together. In at least one other embodiment, the cells 132 may be integral portions of a single housing. The cells 132 may be formed of an elastic material (for example, an elastomeric material, such as rubber) that retains fluid within the fluid-retaining chambers 136. As fluid is moved out of one cell 132, the cell 132 compresses (for example, deflates). As fluid is moved into one cell 132, the cell 132 expands (for example, inflates). In at least one other embodiment, the cells 132 may be formed an inelastic material (such as a plastic). In such embodiment, the cells 132 may not be completely filled with fluid, thereby allowing fluid to migrate (that is, flow) between the cells 132.

The fluid may be air, for example. Air is readily available, and the cells 132 may be quickly and easily filled with air. In at least one other embodiment, the fluid may be another gas, such as an inert gas. In at least one embodiment, the cells 132 may retain gaseous nitrogen. In at least one other embodiment, the fluid may be a liquid, such as water. However, a liquid is heavier than air and nitrogen. As such, in environments that seek to reduce weight (such as within an aircraft, as reduced weight leads to less fuel consumption and costs), using air, nitrogen, or other inert gases may be particularly desirable.

As shown, each of the cells 132 may have a hexagonal axial cross-section. In this manner, the cells 132 interlock or otherwise interconnect together in a honeycomb pattern, such that no spaces may be between adjacent cells 132. In at least one other embodiment, the cells 132 may be spaced apart from one another. As another example, the cells 132 may have different axial cross-sections, such as circular, triangular, square-shaped, octagonal, or the like. The cells 132 may or may not directly abut into one another. In at least one embodiment, at least some of the cells 132 may have different axial cross-sections than other cells 132. For example, some of the cells 132 may have diamond shaped axial cross-sections, while other cells 132 may have octagonal axial cross-sections. The support base 122 may include more or less cells 132 than shown.

Fluid within the cells 132 is able to migrate (that is, flow) between the cells 132 via the fluid exchange sub-system 124. The fluid exchange sub-system 124 includes a plurality of tubes 140 that connect to fluid couplings 142 that connect to each of the cells 132. For example, the fluid exchange sub-system 124 may be a tubular manifold that includes the tubes 140 underneath the support base 122, such that the fluid couplings 142 connect to undersides of the cells 132 and are in fluid communication with the fluid-retaining chambers 136. The tubes 140 and fluid couplings 142 may be rigid tubes (such as metal or hard plastic tubular structures), or flexible (such as rubber or soft plastic hoses). The fluid exchange sub-system 124 may include a single valve at a central hub that connects to each of the fluid couplings 142 that are coupled to the cells 132. In at least one other embodiment, the fluid couplings 142 may each include a valve. In at least one other embodiment, groups of the cells 132 may be coupled together via a valve. For example, a first valve may couple fluid couplings 142 of a left side of the support base 122, a second valve may couple fluid couplings of a mid-section of the support base 122, and a third valve may couple fluid couplings of a right side of the support base 122.

In at least one other embodiment, instead of a manifold of tubes underneath the support base 122, the fluid exchange sub-system 124 may include fluid channels directly between the cells 132. For example, adjacent cells 132 may fluidly connect to one another through tubes or channels that extend through the main bodies 134.

Figure 5:
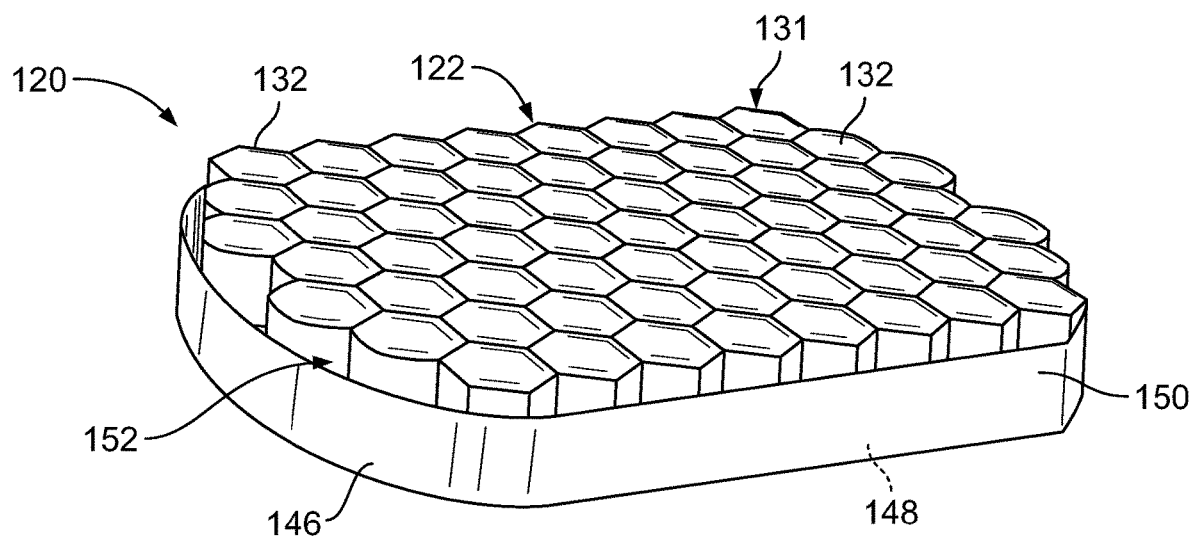
FIG. 5 illustrates a perspective top view of a support base of a shape adapting system, according to an embodiment of the present disclosure.

FIG. 5 illustrates a perspective top view of the support base 122 of the shape adapting system 120 according to an embodiment of the present disclosure. The shape adapting system 120 may include a retaining tray 146 having a lower panel 148 and a perimeter wall 150 extending upwardly from the panel 148. A cell-retaining chamber 152 is defined between the panel 148 and the perimeter wall 150. The array 131 of cells 132 is retained by the retaining tray 146 within the cell-retaining chamber 152. Optionally, the shape adapting system 120 does not include the retaining tray 146.

Figure 6:
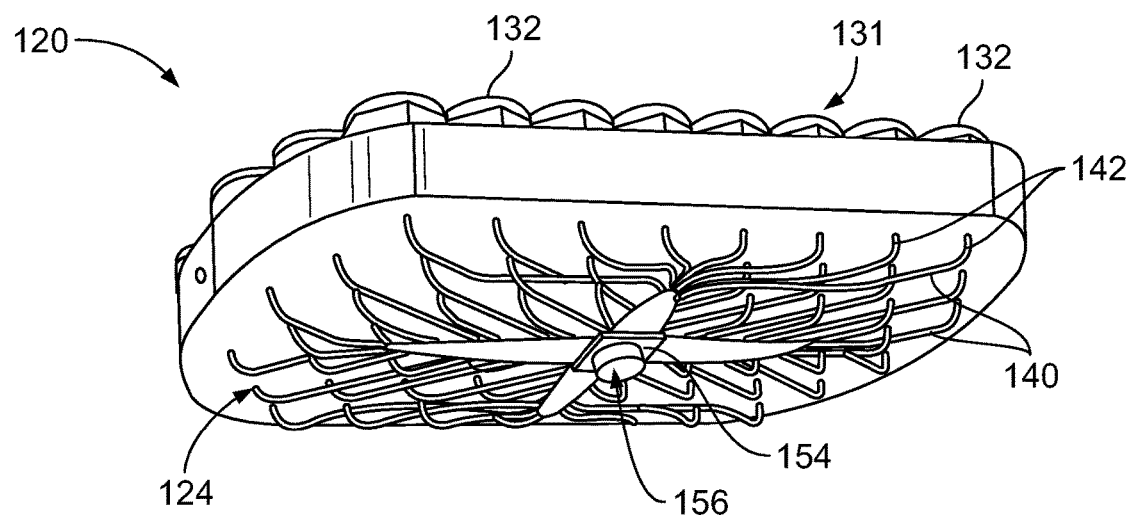
FIG. 6 illustrates a perspective bottom view of the support base of the shape adapting system of FIG. 5.

FIG. 6 illustrates a perspective bottom view of the support base 122 of the shape adapting system of FIG. 5. The fluid exchange sub-system 124 may include a central hub 154 into which the tubes 140 connect. A valve 156 is disposed at the central hub 154. By positioning the valve 156 at the central hub 154, the valve 156 is operatively coupled to each of the cells 132 of the array 131. The valve 156 is an example of the valve 128 shown in FIGS. 2 and 3.

Figure 7:
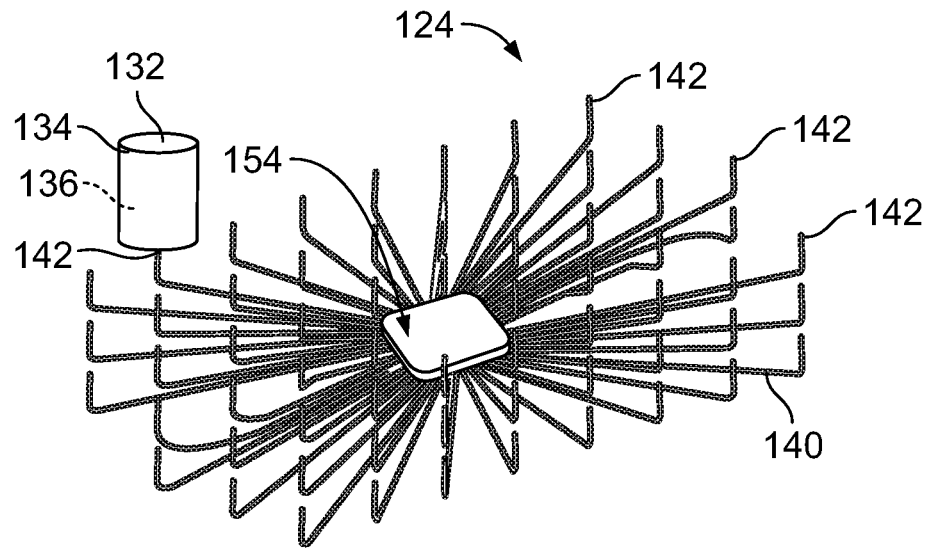
FIG. 7 illustrates a perspective top view of a fluid exchange sub-system, according to an embodiment of the present disclosure.

FIG. 7 illustrates a perspective top view of the fluid exchange sub-system 124, according to an embodiment of the present disclosure. As shown, the fluid couplings 142 that are fluidly coupled to the fluid-retaining chambers 136 of the cells 132 connect to the tubes 140 which fluidly connect together at the hub 154. As such, fluid is able to migrate (that is, flow) between the cells 132 when the valve 156 (shown in FIG. 6) positioned at the hub 154 is opened. In at least one other embodiment, multiple hubs may be used to fluidly interconnect different groups of the cells 132 together. Further, instead of single valve 156, multiple valves may be used. For example, valves may be coupled to each of the fluid couplings 142.

Figure 8:
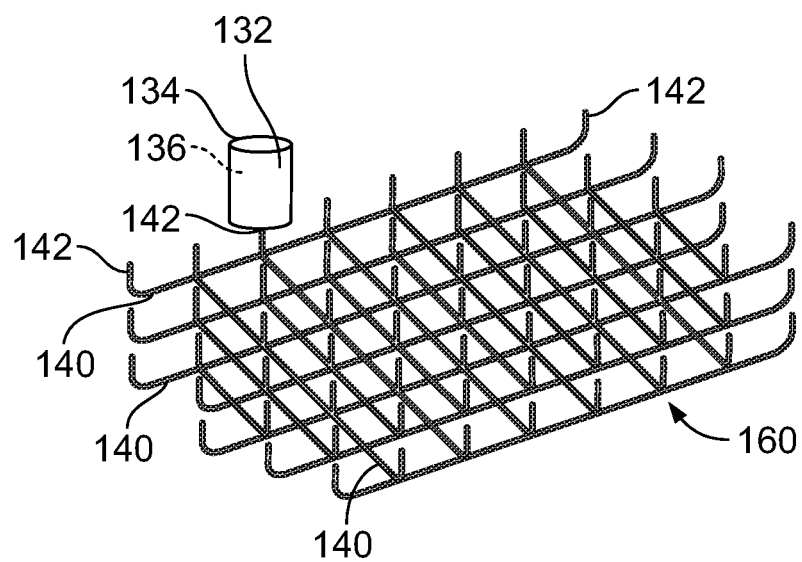
FIG. 8 illustrates a perspective top view of a fluid exchange sub-system, according to an embodiment of the present disclosure.

FIG. 8 illustrates a perspective top view of the fluid exchange sub-system 124, according to an embodiment of the present disclosure. In this embodiment, instead of single hub, the fluid couplings 142 are fluidly coupled together through an interconnected mesh 160 of tubes 140.

Figure 9:
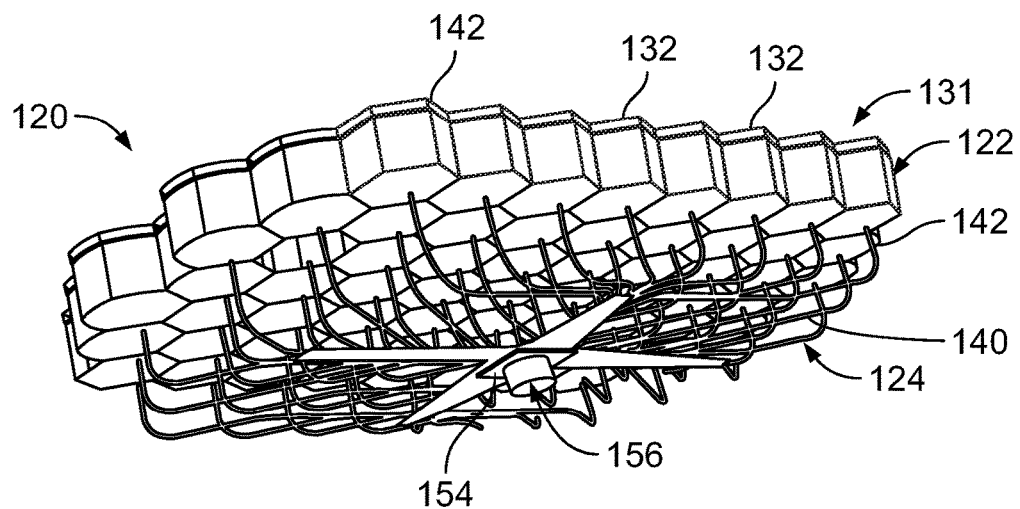
FIG. 9 illustrates a perspective bottom view of a shape adapting system, according to an embodiment of the present disclosure.

FIG. 9 illustrates a perspective bottom view of the shape adapting system 120, according to an embodiment of the present disclosure. As shown, the support base 122 may not be retained by a retaining tray (such as the retaining tray 146 show in FIG. 5). The valve 156 is positioned at the hub 154.

The fluid exchange sub-system 124 may be underneath the support base 122. Optionally, the fluid exchange sub-system 124 may be disposed within the support base 122.

For example, the tubes 140 and the fluid couplings 142 may extend within the support base 122, instead of below the support base 122. The hub 154 and the valve 156 may also be within the support base 122.

Figure 10:
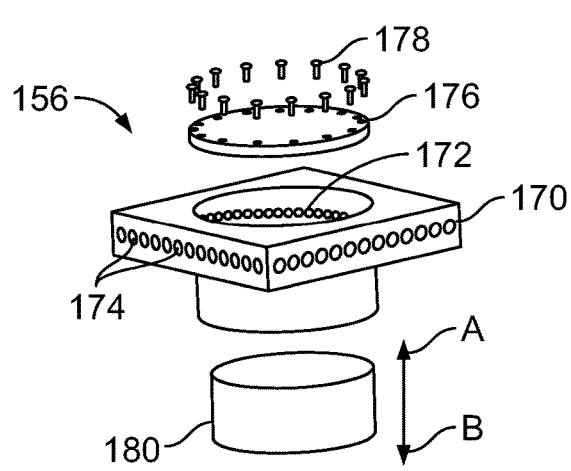
FIG. 10 illustrates a perspective exploded view of a valve, according to an embodiment of the present disclosure.

FIG. 10 illustrates a perspective exploded view of the valve 156, according to an embodiment of the present disclosure. The valve 156 includes a housing 170 that includes a central channel 172 that connects to a plurality of fluid passages 174, each of which connects to a tube 140 (which in turns connects to a fluid coupling 142), as shown in FIG. 9. A mounting plate 176 connects to the hub 154 (shown in FIG. 9), such as through one or more fasteners 178. An internal sleeve 180 is moveably secured within the central channel 172. Referring to FIGS. 2, 3, 9, and 10, the control 126 is operatively coupled to the valve 156. When the control 126 is engaged (or optionally disengaged) to move the valve 156 into the closed position in order to close the valve 156, the sleeve 180 moves upwardly in the direction of arrow A to block the fluid passages 174 so that fluid is unable to pass therebetween. When the control 126 is engaged to move the valve 156 into the open position to open the valve 156, the sleeve 180 moves downwardly in the direction of arrow B to open the fluid passages 174, thereby allowing fluid to pass therebetween.

Figure 11:
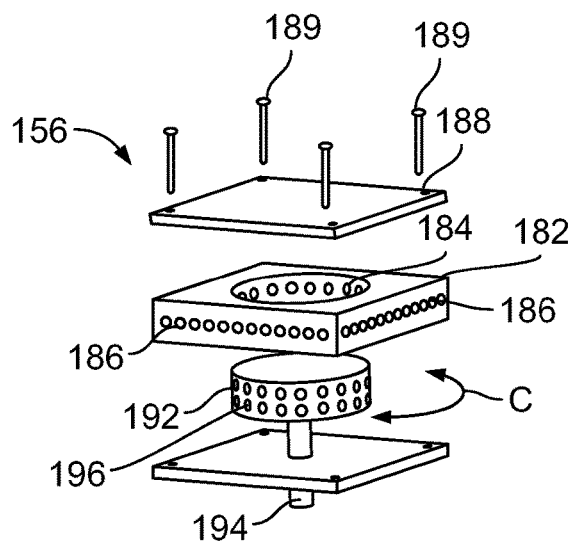
FIG. 11 illustrates a perspective exploded view of a valve, according to an embodiment of the present disclosure.

FIG. 11 illustrates a perspective exploded view of the valve 156, according to an embodiment of the present disclosure. In this embodiment, the valve 156 includes a housing 182 that includes a central channel 184 that connects to a plurality of fluid passages 186, each of which connects to a tube 140 (which in turns connects to a fluid coupling 142), as shown in FIG. 9. A mounting plate 188 connects to the hub 154 (shown in FIG. 9), such as through one or more fasteners 189. A wheel 192 connected to an axle 194 is rotatably secured within the central channel 184. The wheel 192 includes a plurality of fluid passages 196. Referring to FIGS. 2, 3, 9, and 10, the control 126 is operatively coupled to the valve 156 to rotate the fluid passages 196 into an out of alignment with the fluid passages 186 in the direction of arc C. When the control 126 is engaged to close the valve 156, the fluid passages 196 are not aligned with the fluid passages 186, thereby preventing fluid from passing therebetween. When the control 126 is engaged to open the valve 156, the fluid passages 196 align and connect with the fluid passages 186, thereby allowing fluid to pass therebetween.

FIGS. 10 and 11 illustrate examples of valves 156. It is to be understood that various other types of valves may be used to selectively prevent and allow fluid migration between the cells 132 (shown in FIG. 9).

Figure 12:
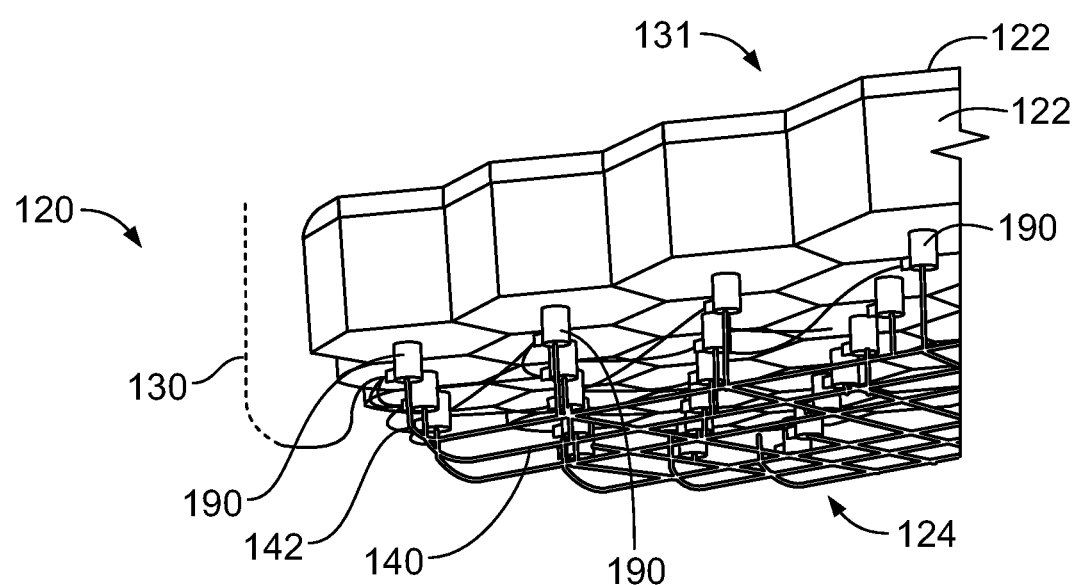
FIG. 12 illustrates a perspective bottom view of a portion of a shape adapting system, according to an embodiment of the present disclosure.

FIG. 12 illustrates a perspective bottom view of a portion of the shape adapting system 120, according to an embodiment of the present disclosure. In this embodiment, instead of a single valve at a central hub, the fluid exchange sub-system 124 includes valves 190 on each of the fluid couplings 142 that fluid connect to the cells 132. In particular, each cell 132 may be associated with a separate and distinct valve 190. The valves 190 are operatively coupled to the control 126 (shown in FIGS. 2 and 3) via the connection 130. The valves 190 are examples of the valves 128 shown in FIGS. 2 and 3.

Figure 13:
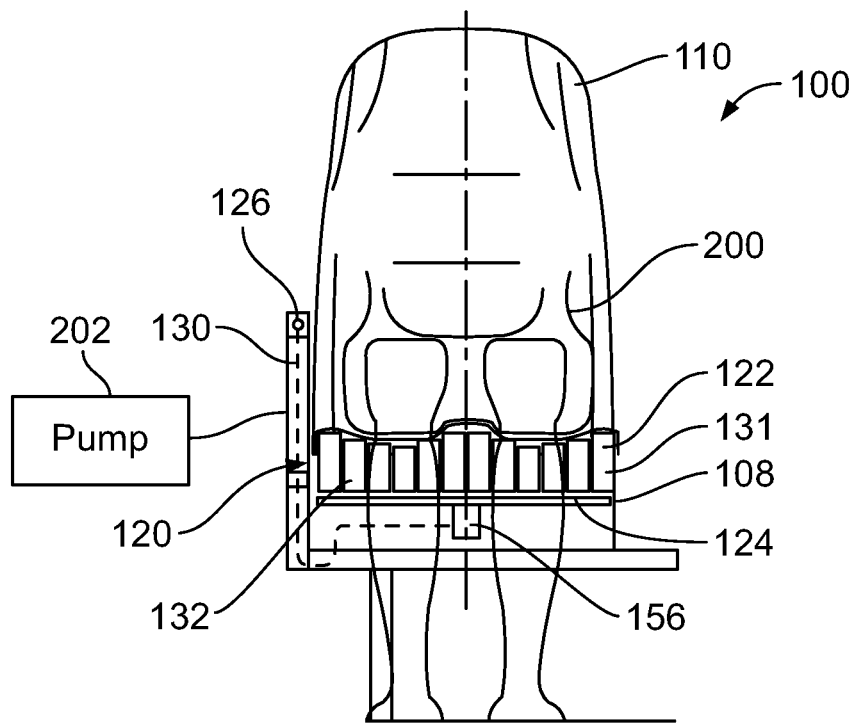
FIG. 13 illustrates a front view of a seat assembly including a shape adapting system in which a support base is in a first position, according to an embodiment of the present disclosure.

FIG. 13 illustrates a front view of a seat assembly including a shape adapting system 120 in which the support base 122 is in a first position, according to an embodiment of the present disclosure. As an individual 200 sits on the seat cushion 108, the support base 122 is in a static position, due to the control valve 156 (and/or valves 190 shown in FIG. 12) being closed, thereby preventing fluid from migrating between the cells 132 of the array 131. When the control 126 is engaged to move the valve 156 (and the valves 190) into an open position, the weight and position of the individual 200 on the support base 122 causes fluid to migrate to different areas of the support base 122. For example, the weight of the individual 200 directly over certain cells 132 causes those cells 132 to compress (for example, deflate). As fluid leaves the deflating cells 132, the fluid passes to other cells 132 (such as those having less weight exerted thereon), causing those cells 132 to expand (for example, inflate). Accordingly, the shape of the support base 122 changes or otherwise adapts based on the shifting position of the individual 200 when the valve 156 (and/or the valves 190) is open. As the individual 200 continues to shift weight on the support base 122, the shape of the support base 122 (via the resulting compression and expansion of the cells 132) continues to adapt. When the individual 200 is satisfied with a particular shape of the support base 122, the individual engages (or disengages) the control 126 to close the valve 156 (and/or the valves 190), thereby preventing fluid migration between the cells 132 and maintaining a desired shape of the support base 122.

In at least one embodiment, the shape adapting system 120 may include a pump 202, which is fluidly coupled to the fluid exchange sub-system 124. When the valve 156 (and/or the valves 190) is open, the pump 202 may be selectively operated to provide additional fluid or remove fluid from the array 131 of the cells 132. In this manner, the pump 202 may be an additional component that is used to selectively increase or decrease overall fluid pressure within the array 131. The pump 202 may be an electric pump, a pneumatic pump, a hand pump, a hydraulic pump, and/or the like.

Figure 14:
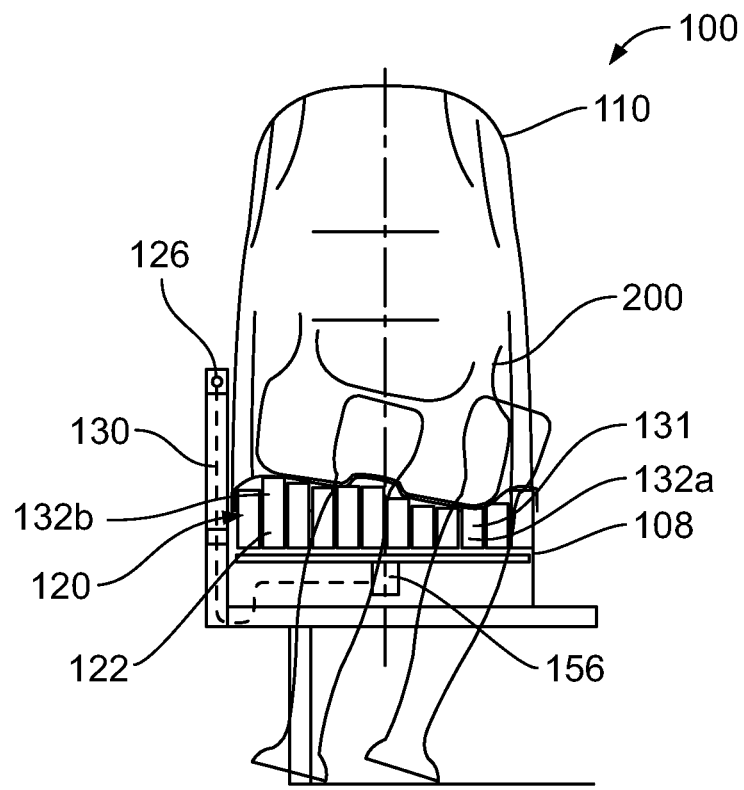
FIG. 14 illustrates a front view of the seat assembly including the shape adapting system in which the support base is in a second position, according to an embodiment of the present disclosure.

FIG. 14 illustrates a front view of the seat assembly 100 including the shape adapting system 120 in which the support base 122 is in a second position, according to an embodiment of the present disclosure. As shown, as the individual 200 shifts weight to one side (or end), the cells 132a on which the weight is shifted deflate, while the cells 132b on which less weight is exerted inflate. At a desired position, the individual engages (or disengages) the control 126 in order to close the valve 156 (and/or the valves 190 shown in FIG. 120) to prevent further fluid migration between the cells 132 and lock the desired shape of the support base 122 in place. If the individual 200 wishes to change shape of the support base 122, the individual 200 engages the control 126 to open the valve 156 (and/or the valves 190) so that fluid may migrate between the cells 132. Then, the individual shifts position on the support base 122 to selectively deflate and inflate the cells 132 until a desired shape is reached, at which point the control 126 is engaged (or disengaged) to close the valve 156 (and/or the valves 190).

As described herein, the cells 132 are configured to allow the fluid to migrate among the cells 132 when the valve(s) 156 and/or 190 is in the open position in response to force (such as shifting weight of an individual) exerted into the support base 122. As the fluid migrates among the cells 132, different cells 132 may expand or compress, depending on the areas of the support base 122 on which the force is directed.

Figure 15:
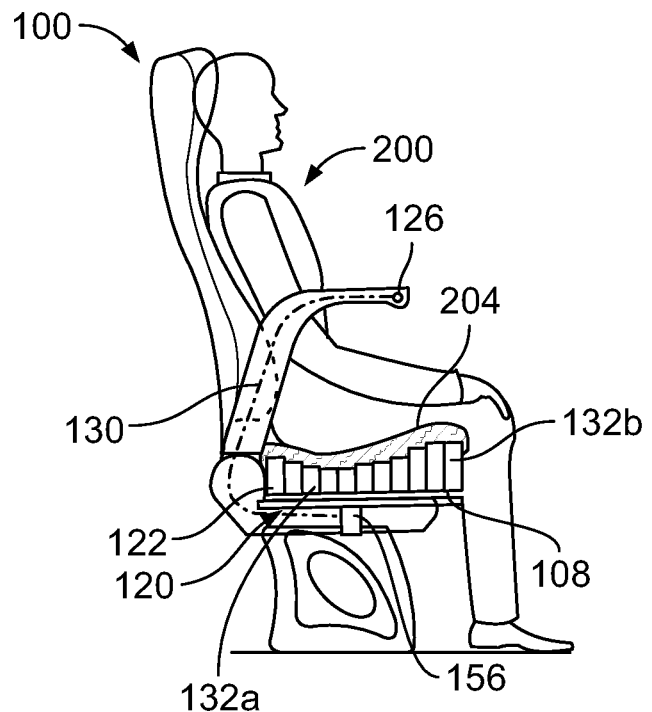
FIG. 15 illustrates a side view of a seat assembly including a shape adapting system in which a support base is in a first position, according to an embodiment of the present disclosure.

FIG. 15 illustrates a front view of the seat assembly 100 including the shape adapting system 120 in which the support base 122 is in a first position, according to an embodiment of the present disclosure. As shown, when the valve 156 (and/or the valves 190 shown in FIG. 12) are open, and the individual 200 is seated towards a rear of the seat cushion 108, rear cells 132a directly underneath the weight of the individual 200 are deflated (or otherwise compressed), while front cells 132b that do not directly bear the weight of the individual 200 are inflated (or otherwise expanded). As shown, a cover 204 may be positioned over the support base 122. The cover 204 may be or include a foam cushion layer and/or a cover fabric.

Figure 16:
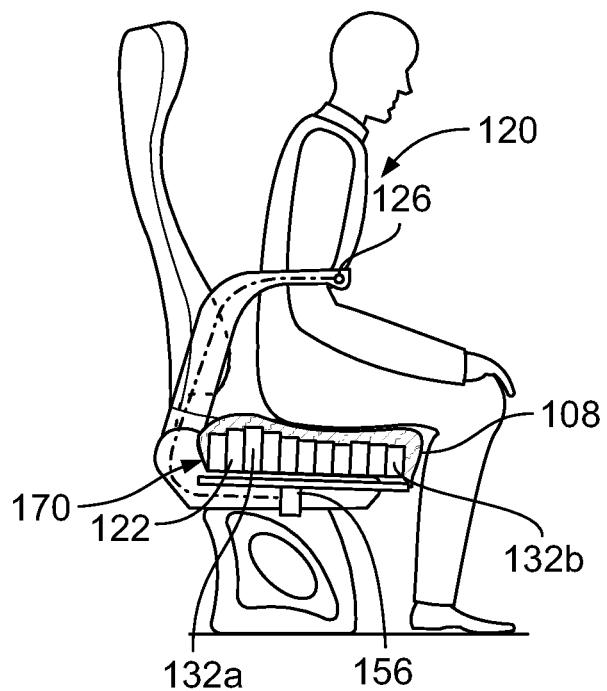
FIG. 16 illustrates a side view of the seat assembly including the shape adapting system in which the support base is in a second position, according to an embodiment of the present disclosure.

FIG. 16 illustrates a front view of the seat assembly 100 including the shape adapting system 120 in which the support base 122 is in a second position, according to an embodiment of the present disclosure. When the valve 156 (and/or the valves 190 shown in FIG. 12) is opened, and the individual 200 shifts weight towards the front of the seat cushion 108, the rear cells 132 inflate (or otherwise expand), while the front cells 132b directly bear more weight of the individual 200, and therefore deflate (or otherwise compress). Again, when the individual 200 adjusts the support base 122 to a desired shape via shifting positions on the support base 122, the individual 200 may then operate the control 126 to close the valve 156 (and/or the valves 190) to prevent further fluid migration between the cells 132 and lock the desired position of the support base 122 in place.

Figure 17:
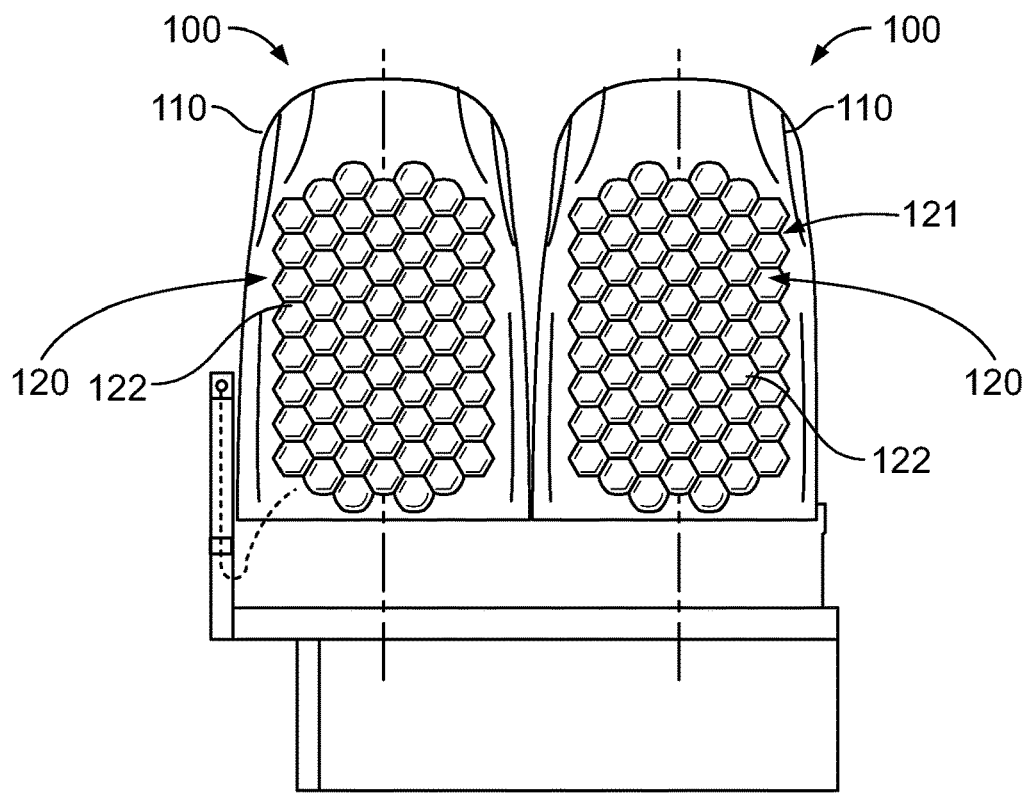
FIG. 17 illustrates a front view of seat assemblies, according to an embodiment of the present disclosure.
Figure 18:
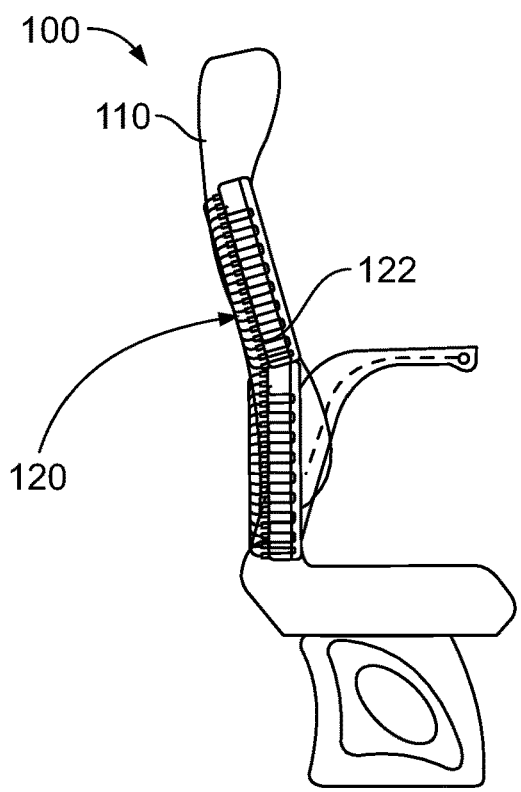
FIG. 18 illustrates a side view of a seat assembly, according to an embodiment of the present disclosure.

FIG. 17 illustrates a front view of seat assemblies 100, according to an embodiment of the present disclosure. FIG. 18 illustrates a side view of a seat assembly 100. Referring to FIGS. 17 and 18, the seat assemblies 100 include shape adapting systems 120. As shown, the shape adapting system 120 may include the support bases 122 in backrests 110 instead of or in addition to the seat cushions 108. A backrest, such as the backrests 110, that includes the shape adapting system 120, is an example of a cushion assembly 121.

Figure 19:
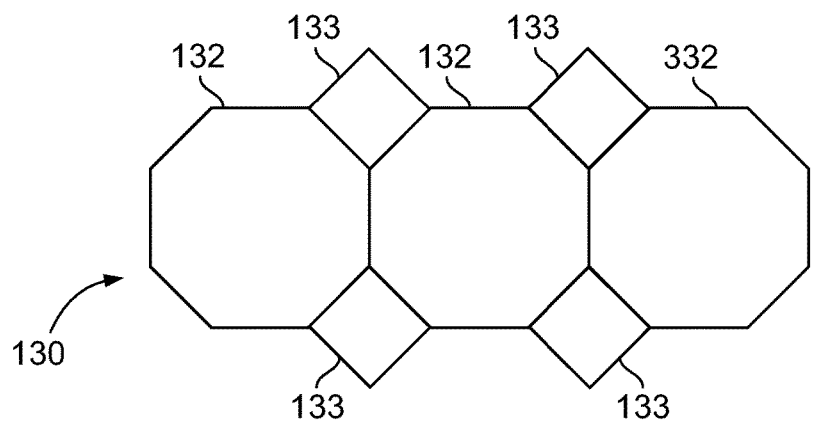
FIG. 19 illustrates a top view of a portion of an array of cells of a support base, according to an embodiment of the present disclosure.

FIG. 19 illustrates a top view of a portion of an array 131 of cells 132 of a support base 122, according to an embodiment of the present disclosure. As shown, the cells 132 may include an octagonal axial cross section. Diamond-shaped spacers 133 may be positioned at areas between adjacent cells 132. The spacers 133 may be formed of foam. In at least one other embodiment, the spacers 133 may be fluid-retaining cells. As noted above, the cells 132 may be sized and shaped differently than shown. The cells 132 may or may not abut against one another. Different cells 132 within the array 131 may be sized and shaped in a different manner.

Figure 20:
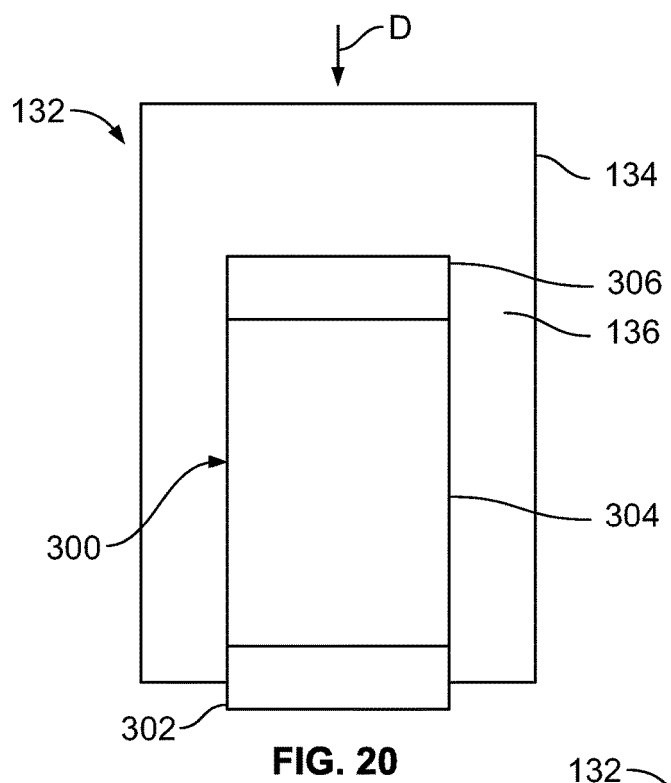
FIG. 20 illustrates a simplified lateral view of a cell in an expanded state, according to an embodiment of the present disclosure.

FIG. 20 illustrates a simplified lateral view of a cell 132 in an expanded state, according to an embodiment of the present disclosure. The cell 132 may include an inflator 300 that allows an individual to manually add additional fluid pressure to the cell 132 without the need for a separate and distinct pump (such as shown in FIG. 13). Each cell 132 within an array may include an inflator 300.

The inflator 300 includes an inlet check valve 302 that extends into the fluid-retaining chamber 136. The inlet check valve 302 connects to an internal ballast 304, which may include a biasing member (such as a spring). An outlet check valve 306 connects to the ballast 304 opposite from the inlet check valve 302.

Figure 21:
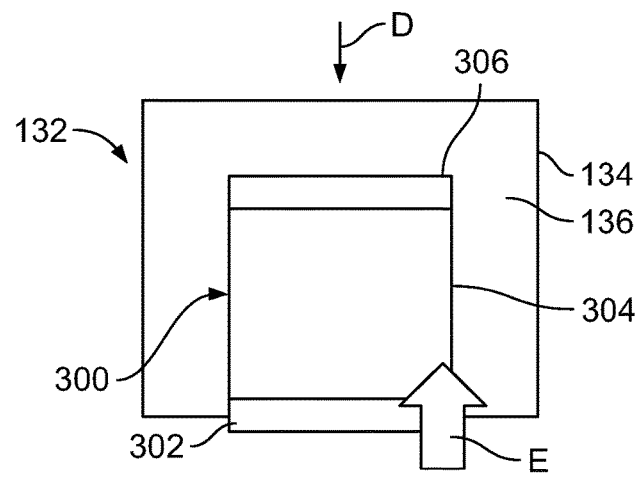
FIG. 21 illustrates a simplified lateral view of a cell in a compressed state, according to an embodiment of the present disclosure.

FIG. 21 illustrates a simplified lateral view of the cell 132 in a compressed state, according to an embodiment of the present disclosure. Referring to FIGS. 20 and 21, when pressure is exerted into the cell 132 in the direction of arrow D to compress the cell 132, the ballast 304 compresses and exerts a force into the inlet check valve 302, thereby causing the inlet check valve 302 to allow fluid (such as air) to be drawn into the inflator 300 in the direction of arrow E. As pressure is released form the cell 132, the biasing member of the ballast 304 forces the ballast 304 to return back to its expanded state, draw the fluid therein, and release the fluid into the fluid-retaining chamber 136 through the outlet check valve 306. In this manner, an individual may inflate the cell 132 (and other cells 132 within an array 131) by moving up and down on the cell(s) 132, thereby increasing the fluid pressure within the cell(s) 132.

Referring to FIGS. 1-21, embodiments of the present disclosure provide a seat assembly 100 that includes a seat cushion 108, a backrest 110 coupled to the seat cushion 108, and a shape adapting system 120 coupled to one or both of the seat cushion 108 or the backrest 110. The shape adapting system 120 includes a support base 122 including an array 131 of cells 132 that retain a fluid, a fluid exchange sub-system 124 coupled to the cells 132 (in which the fluid exchange sub-system 124 fluidly connects the cells 132 together), and at least one valve 156 and/or 190 coupled to the fluid exchange sub-system 124. The valve(s) 156 and/or 190 is configured to move between an open position in which the fluid is able to migrate among the cells 132 to change a shape of the support base 122, and a closed position in which the shape of the support base 122 is maintained.

Figure 22:
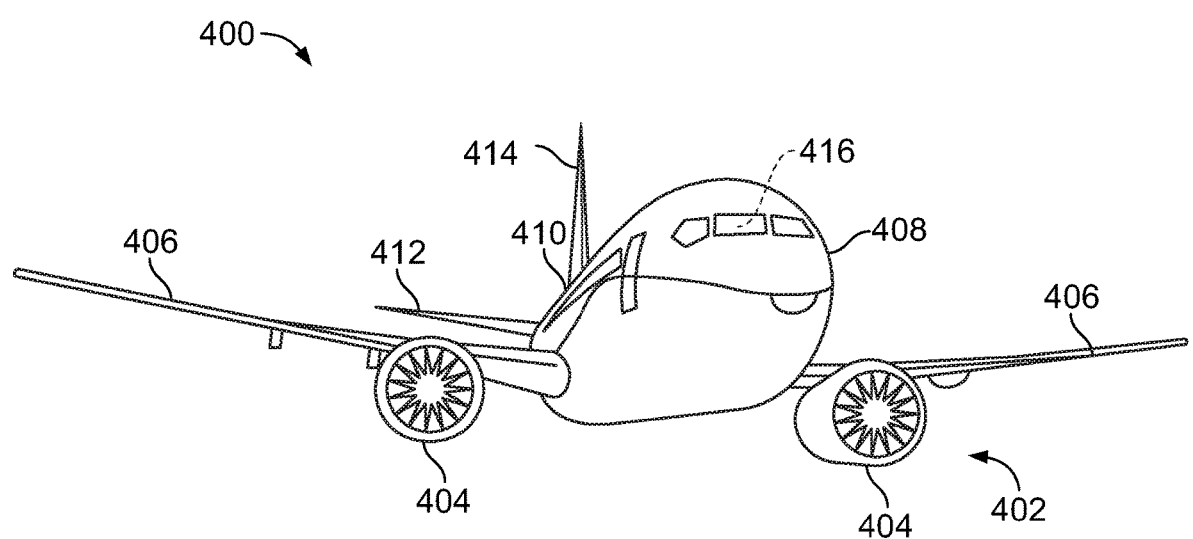
FIG. 22 illustrates a front perspective view of a vehicle, according to an embodiment of the present disclosure.

FIG. 22 illustrates a front perspective view of a vehicle, such as an aircraft 400, according to an embodiment of the present disclosure. The aircraft 400 includes a propulsion system 402 that may include two turbofan engines 404, for example. Optionally, the propulsion system 402 may include more engines 404 than shown. The engines 404 are carried by wings 406 of the aircraft 400. In other embodiments, the engines 404 may be carried by a fuselage 408 and/or an empennage 410. The empennage 410 may also support horizontal stabilizers 412 and a vertical stabilizer 414.

The fuselage 408 of the aircraft 400 defines an interior cabin 416, which may include a cockpit, one or more work sections (for example, galleys, personnel carry-on baggage areas, and the like), one or more passenger sections (for example, first class, business class, and coach sections), and an aft section. The interior cabin 416 includes seat assemblies 100 having shape adapting systems 120, such as shown and described with respect to FIGS. 1-21. Alternatively, instead of an aircraft, embodiments of the present disclosure may be used with various other vehicles, such as automobiles, buses, locomotives and train cars, seacraft, spacecraft, and the like. Further, embodiments of the present disclosure may be used with seats and seat assemblies whether or not they are within vehicles.

Figure 23:
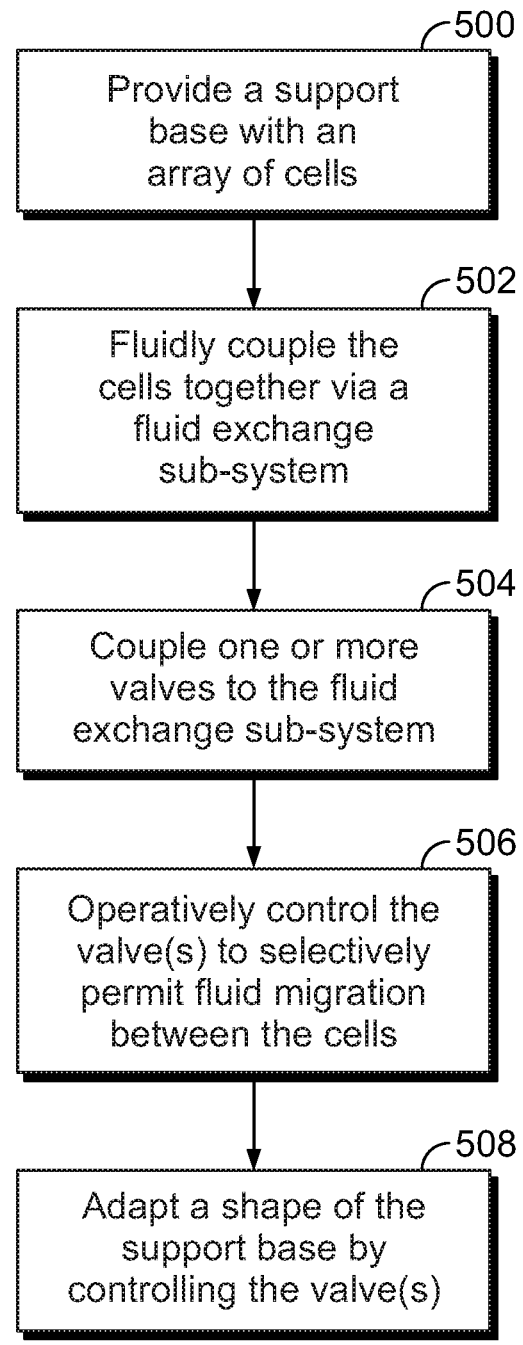
FIG. 23 illustrates a flow chart of a method of forming a seat assembly, according to an embodiment of the present disclosure.

FIG. 23 illustrates a flow chart of a method of forming a seat assembly having a shape adapting system, according to an embodiment of the present disclosure. Referring to FIGS. 1-23, at 500, a support base 122 having an array 131 of cells 132 is provided. At 502, the cells 132 are fluidly coupled together via a fluid exchange sub-system 124. At 504, one or more valves 156 and/or 190 are coupled to the fluid exchange sub-system 124. At 506, the valve(s) 156 and/or 190 are operatively controlled to selectively permit fluid migration between the cells 132. For example, when the valve(s) 156 and/or 190 are opened, fluid is able to migrate (that is, flow) between the cells 132. When the valve(s) 156 and/or 190 are closed, fluid is unable to migrate between the cells 132. At 508, a shape of the support base 122 is adapted by controlling the valve(s) 156 and/or 190 (and by an individual shifting positions on the support base 122 when the valve(s) 156 and/or 190 are opened).

As described herein, embodiments of the present disclosure provide seat assemblies including shape adapting systems. The shape adapting systems allow individuals to conform portions (such as seat cushions and/or backrests) to desired supporting shapes. The shape adapting systems provide seat assemblies having increased comfort. Individuals are able to adjust support positions and pressure points via the shape adapting systems.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A shape adapting system of a cushion assembly, the shape adapting system comprising:
   a support base including an array of cells that retain a fluid;
   wherein each of the cells comprises an inflator that allows an individual to manually add additional fluid pressure thereto, wherein the inflator comprises an inlet check valve coupled to a ballast, and an outlet check valve coupled to the ballast opposite from the inlet check valve;
   a fluid exchange sub-system coupled to the cells, wherein the fluid exchange sub-system fluidly connects the cells together;
   at least one valve coupled to the fluid exchange sub-system, wherein the at least one valve is configured to move between an open position in which the fluid is able to migrate among the cells to change a shape of the support base, and a closed position in which the shape of the support base is maintained; and
   an armrest that includes a control directly and operatively coupled to the at least one valve, wherein the control is configured to directly and selectively move the at least one valve between the open position and the closed position.

2. The shape adapting system of claim 1, wherein the control is one or both of on or within the armrest.

3. The shape adapting system of claim 1, wherein each of the cells comprises a main body defining an internal fluid-retaining chamber.

4. The shape adapting system of claim 1, wherein at least one of the cells is formed of an elastomeric material.

5. The shape adapting system of claim 1, wherein the fluid is a gas.

6. The shape adapting system of claim 5, wherein the gas is air.

7. The shape adapting system of claim 1, wherein the fluid is a liquid.

8. The shape adapting system of claim 7, wherein the liquid is water.

9. The shape adapting system of claim 1, wherein the cells are hexagonal and interconnected together in a honeycomb pattern.

10. The shape adapting system of claim 1, wherein the fluid exchange sub-system comprises one or more tubes connected to fluid couplings that connect to the cells.

11. The shape adapting system of claim 1, wherein the fluid exchange sub-system comprises a hub that is in fluid communication with the cells, wherein the at least one valve is a single valve at the hub.

12. The shape adapting system of claim 1, wherein the at least one valve comprises a plurality of valves associated with the cells, respectively.

13. The shape adapting system of claim 1, wherein the shape adapting system further comprises a retaining tray that retains the array of the cells.

14. The shape adapting system of claim 1, wherein the cells are configured to allow the fluid to migrate among the cells when the at least one valve is in the open position in response to force exerted into the support base.

15. The shape adapting system of claim 1, further comprising a pump in fluid communication with the fluid exchange sub-system, wherein the pump is configured to be operated to selectively inflate and deflate the cells.

16. The shape adapting system of claim 1, wherein the fluid exchange sub-system fluidly connects all of the cells of the support base of the cushion assembly together.

17. A method of forming a shape adapting system of a cushion assembly comprising:
   providing a support base including an array of cells that retain a fluid;
   providing each of the cells with an inflator that allows an individual to manually add additional fluid pressure thereto, wherein the inflator comprises an inlet check valve coupled to a ballast, and an outlet check valve coupled to the ballast opposite from the inlet check valve;

fluidly connecting all of the cells of the support base of the cushion assembly together by coupling a fluid exchange sub-system to the cells;

coupling at least one valve to the fluid exchange sub-system, wherein the at least one valve is configured to move between an open position in which the fluid is able to migrate among the cells to change a shape of the support base, and a closed position in which the shape of the support base is maintained;

providing an armrest including a control;

directly coupling the control to the at least one valve; and selectively moving the at least one valve, directly by the control, between the open position and the closed position.

18. A seat assembly comprising:

a seat cushion;

a backrest coupled to the seat cushion;

an armrest coupled to the backrest and the seat cushion, wherein the armrest includes a control; and a shape adapting system coupled to one or both of the seat cushion or the backrest, wherein the shape adapting system comprises:

a support base including an array of cells that retain a fluid, wherein each of the cells comprises an inflator that allows an individual to manually add additional fluid pressure thereto, and wherein the inflator comprises an inlet check valve coupled to a ballast, and an outlet check valve coupled to the ballast opposite from the inlet check valve;

a fluid exchange sub-system coupled to the cells, wherein the fluid exchange sub-system fluidly connects all of the cells of the support base together;

at least one valve coupled to the fluid exchange sub-system, wherein the at least one valve is configured to move between an open position in which the fluid is able to migrate among the cells to change a shape of the support base, and a closed position in which the shape of the support base is maintained; and the control directly and operatively coupled to the at least one valve, wherein the control is configured to directly and selectively move the at least one valve between the open position and the closed position.

19. The seat assembly of claim 18, wherein at least one of the cells is formed of an elastomeric material.

20. The seat assembly of claim 18, wherein the fluid is a gas.

21. The seat assembly of claim 20, wherein the gas is air.

22. The seat assembly of claim 18, wherein the fluid is a liquid.

* * * * *